B. DARROW.
MECHANICAL EXPANSION MOLD.
APPLICATION FILED MAY 10, 1916.

1,212,457.

Patented Jan. 16, 1917.
2 SHEETS—SHEET 1.

Inventor,
Burgess Darrow

Witness

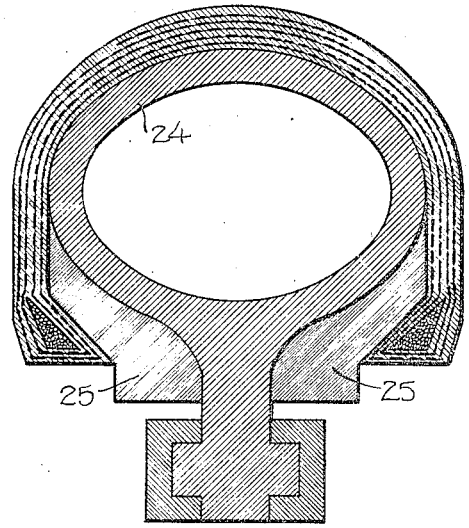
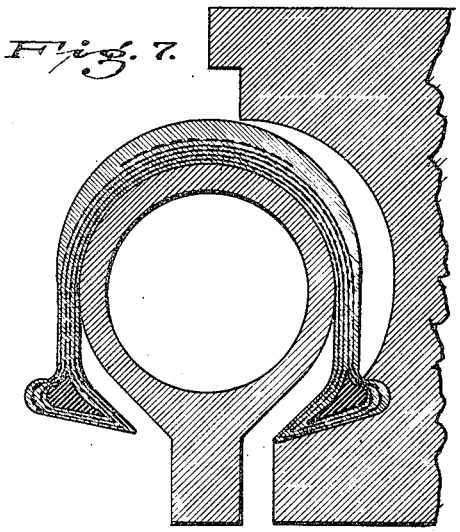
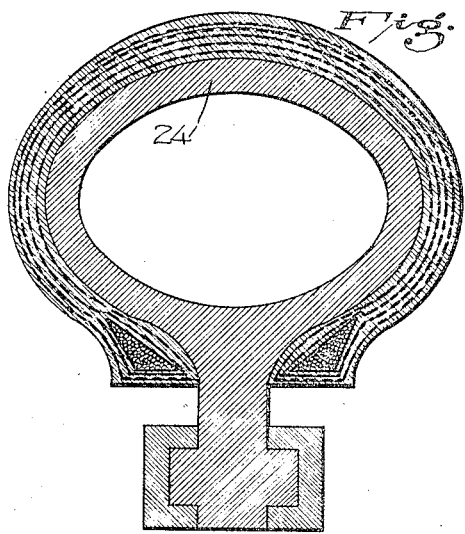
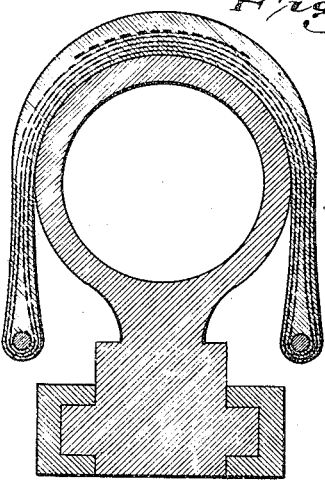

UNITED STATES PATENT OFFICE.

BURGESS DARROW, OF AKRON, OHIO, ASSIGNOR TO THE GOODYEAR TIRE AND RUBBER COMPANY, OF AKRON, OHIO, A CORPORATION OF OHIO.

MECHANICAL EXPANSION-MOLD.

1,212,457.  Specification of Letters Patent.  Patented Jan. 16, 1917.

Application filed May 10, 1916. Serial No. 96,606.

*To all whom it may concern:*

Be it known that I, BURGESS DARROW, a citizen of the United States, residing at Akron, in the county of Summit and State of Ohio, have invented new and useful Improvements in Mechanical Expansion-Molds, of which the following is a specification.

This invention relates to the manufacture of pneumatic tire casings and more particularly relates to that step in the manufacture of such casings, which is concerned with the stretching or expansion of the casing at the time it is placed in the vulcanizing mold.

As a principal object, the present invention contemplates the provision of means whereby the tire is to be built or laid up upon a ring core upon which it may subsequently be cured in such a manner as to produce a full molded tire, and one in which the fabric of the tire has been so symmetrically stretched or expanded as to obviate all wrinkles or lack of uniform tension upon the fabric threads.

A more specific object is to provide means whereby the various plies composing the tire may be laid up upon a core in such a manner that the side walls of the tire will be spaced away from the lower portion of the core periphery, whereby transference of the core and tire to the mold and the closing of the sections of the latter will cause the side walls of the tire to be stretched or expanded along those portions of the core periphery to which they did not previously conform, a proceeding resulting in uniform stretching of the tread from both sides.

Accordingly, the present invention employs a pair of lateral annular pads, which serve to build out the sides of the ring core. The tire is laid up upon the false shape of core resulting from the use of the pads, until it is in readiness for its vulcanization. The pads are then removed and the tire placed in a mold, annular parts of which engage the inextensible bead flanges of the tire and force them to travel into contact with the core proper from which they were originally spaced. This movement effects a stretching of the tire casing equally from each side wall to the center of the tread, in which condition the vulcanization is completed.

The above and additional objects of a similar nature, which will be hereinafter more specifically treated, may be accomplished by such means as are illustrated in the accompanying drawings, described in the following specification and then more particularly pointed out in the claims which are appended hereto and form a part of this application.

Figure 1:
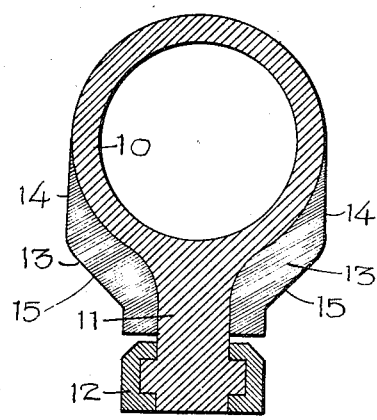
Figure 2:
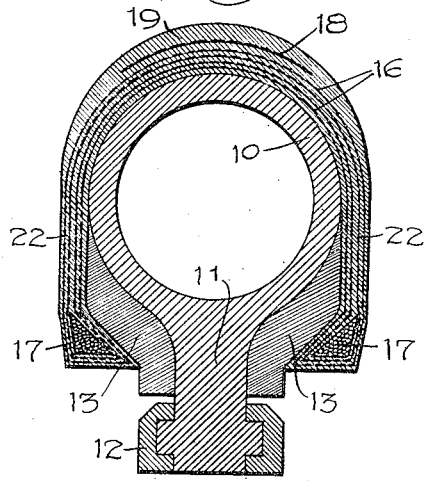
Figure 3:
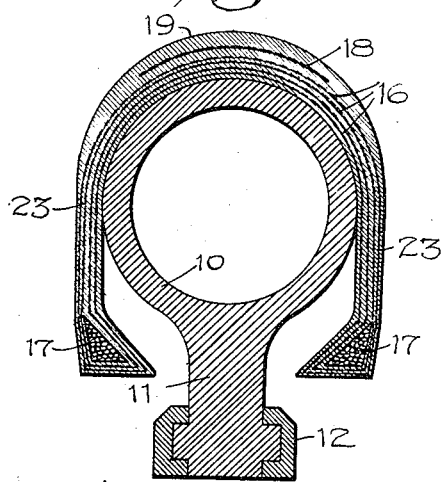
Figure 4:
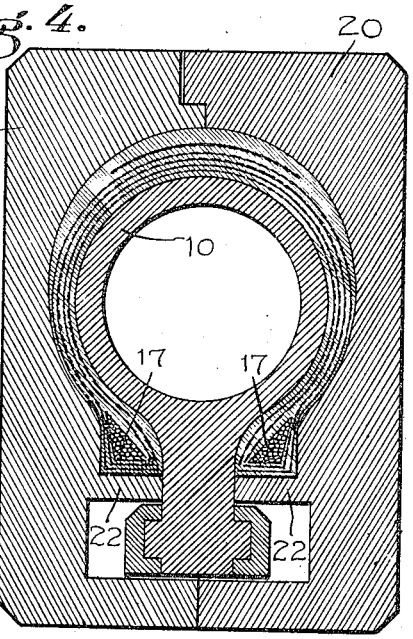

With reference to the drawings, wherein there has been illustrated a preferred embodiment of the invention as it is reduced to practice and throughout the several views of which similar reference numerals designate the corresponding parts: Figures 1 to 4 inclusive form a group of cross-sectional views showing the steps presented by this invention for the manufacture of tire casings of the straight side wall type; Fig. 1 being a view of the core fitted with the side pads; Fig. 2 being a view of the tire as laid up on the padded core of Fig. 1; Fig. 3 being a view of the tire and core after the pads have been removed from the latter; and Fig. 4 being a view of the casing as stretched closely upon its core within the mold; Figs. 5 and 6 show, cross-sectionally, the employment of a modified form of core in order to gain a greater percentage of stretch; Fig. 7 is a fragmentary sectional view showing a tire of the clencher type about to be placed in its mold; and Fig. 8 shows the invention being put to use in the manufacture of a tire of the Dunlop type.

The first step proposed by the present invention, in the manufacture of tire casings of any desired type, is that of building up the side walls of a ring core by the application of pads thereto, reference being directed to the group of Figs. 1 to 4 for the present, and primarily to Fig. 1. The ring core is designated by the numeral 10 and may be of the hollow shape shown to provide a circular cross-section interrupted only by a thin web 11. Upon this web is supported the inner rim 12, which serves to mount the core upon an adjustable chuck of the usual character. Pads 13 are applied to the core in contact with opposite sides of the web 11 and have an outer plane face 14 tapering to substantially a knife edge, such surface being vertically tangential to the core at the extremities of the horizontal diameter of any circular cross-section. Intersecting at an angle with the vertical face 14 is a bias lower surface 15 for each pad, the lower edge of the latter terminating slightly above the rim 12. The interior face of the pad is a compound curve in registry and in contact with both the rounded portion of the core and the web 11. These pads, which may be of soft rubber, or of rubber reinforced with fabric inserts as in Fig. 5, or of rubberized burlap, felt or any other relatively compressible material, are attached to the sides of the core by a suitable adhesive such as rubber cement. Some slight deformation of the pads is required when removing them from the core after a tire has been built thereon, but the compression of the pads resulting from the tire-building process is not sufficient to distort their shape.

The ring core being now provided with padded sides, (Fig. 2) the various plies of rubberized fabric 16 are laid up thereon in the usual fashion, beads 17 being placed in the customary manner within the depending toe flanges of the tire carcass. The inner sides of the toe flanges are in contact, it will be observed, with the slanting outer faces 15 of the core pads, and the tire side walls engage the vertical surfaces 14.

After the carcass has been entirely built up, including the breaker strip 18 and the tread stock 19, the pads 13 are then ripped out leaving the carcass in the position illustrated in Fig. 3 with side walls tangentially dependent from the core 10 and the toe edges spaced from the web 11. It now remains to place the carcass within its mold in such manner as to impart the desired stretch to both side walls and tread before completion of the process of vulcanization.

The mold parts 20 and 21 are constructed as usual to accommodate the inextensible beads 17 within annular flanges 22, which prevents any shifting of these beads, and consequent displacement of the tire during the stretching process. When the mold parts are approached to their locking position in Fig. 3 to one of complete contact with the annular core pockets formed at the junction therewith of the web 11, it is obvious that this movement will stretch the side walls 23 of the tire tightly about the lower rounded portion of the core periphery, such stretch being equal upon each side wall throughout the entire carcass and equally transmitted therethrough to the tread 19. It has been found in practice that the stretch, which can be imparted to the fabric in this manner is the full equivalent of the stretch which has heretofore been obtained by curing a tire carcass on an air bag or under hydraulic pressure. Obviously the present method is cheaper, both as to labor and equipment, than the air bag or hydraulic methods of stretching.

For the purpose of imparting a greater degree of stretch to a fabric or cord carcass than is obtainable with the use of the ordinary ring core of circular cross-section, which has been disclosed in the group of Figs. 1 to 4, recourse may be had to the core denoted by the numeral 24 in Figs. 5 and 6. The core 24 has a section of oval form, and it will be observed that pads 25 of a relatively increased thickness may be employed in connection therewith to space the toe flanges of a tire a greater distance from the core and web than results from the use of a sectionally circular core, due to the fact that the typical major axis of the oval-formed core is greater than the horizontal diameter of a correspondingly sized core of circular form. In other respects the use of the core 24 follows with exactitude that outline for the core 10.

In Fig. 7 there has been illustrated the use of a core for both the building and stretching of a clencher-bead tire, which differs in no important respect from the means above particularized for obtaining similar results from the straight side wall type of tire disclosed in Figs. 1 to 6 inclusive. This is equally true of the manipulation necessary when employing this invention in connection with the Dunlop type tire shown in Fig. 8.

It will accordingly be quite obvious that my present invention is capable of universal application to all the types of tires as a substitute for the hydraulic method of stretching the tires during their vulcanization. I have found that not only is my method economically desirable in comparison with the method of hydraulic expansion, but is also capable of securing to the user results of the same nature and of equal value. I am aware, however, that it has been previously proposed (notably in United States Letters Patent granted to C. W. Stultz, November 30, 1915, No. 1,161,906) to space the side walls of a tire from the core web during the building of the tire and prior to the vulcanization. The mentioned patent proposes metallic side flanges which are secured in position by bolts arranged in a circumferential series about the rim of the core, which latter is of a special and particular make. I have discovered that the practice inaugurated by this patent is open to numerous objections, of which the following may be enumerated: The side flanges are metallic and accordingly costly and cumbersome; the prevailing type of cores must be discarded in employing this invention, which requires the use of its own special core and numerous bolt fastenings; the metallic side flanges cannot be properly knife edged in practice at the annular lines of tangency of the flanges to the core, resulting in disfiguring and injurious creases on the tire interior; the side flanges are not easily nor quickly applied or removed owing to the plurality of bolts and wedges to be inserted and tightened, in the first case and to be loosened and removed in the latter case. All of these objections are overcome by the provision of the present invention whereby the relatively flexible and compressible pads seat readily within the core pockets after being previously cemented and are as readily ripped out by an abrupt pull when preparing the core for the mold. Moreover the knife edge of the pads can be made as thin as desired to obviate the interior creases in the tire, the edge of the flexible pads not being subject to permanent indentation or roughening in the manner of the metallic side flanges. In addition, the pads are much cheaper, much less cumbersome and require no careful handling in order to prevent their destruction, and have been especially designed for use of the present day core.

What I claim is:

1. In an apparatus for making tire casings, a rigid core to support a casing during the laying up process thereof and during the process of vulcanization, and means relatively compressible to afford a false exterior shape to said core prior to the said process of vulcanization.

2. In an apparatus for making tire casings, a rigid core to support a casing during the laying up process thereof and during the process of vulcanization, and flexible, non-metallic pads adapted to prevent close conformation of the casing to the core prior to the process of vulcanization.

3. In an apparatus for making tire casings, a rigid core to support a casing during the process of laying the casing up thereon and during the process of vulcanization of the casing, annular pockets being formed in the core for accommodation of the casing toe flanges during the said vulcanization process, and relatively compressible means to prevent the entrance of the casing toe flanges into said core pockets during the said laying up process.

4. In an apparatus for making tire casings, a rigid core formed with lateral annular pockets, said core being adapted to support a tire casing during both the laying up and vulcanizing processes of the tire, and flexible means receivable in said core pockets so that the casing side walls may be laid up thereover in tangential dependence from the core, said flexible means being removable from the core pockets prior to the commencement of the vulcanizing process.

5. In an apparatus for making tire casings, a rigid core shaped to fit the interior of a finished tire casing, and pads in conformity to portions of the core to space the toe flanges of the tire casing from the said core portions during the laying up process of the casing, said pads being compressible to admit of removal without deformation of the casing, immediately prior to the vulcanizing process of the latter.

6. In an apparatus for making tire casings, a rigid core formed with lateral annular pockets at the junction of the transverse core circumference with the core web, substantially as described, and relatively deformable pads secured within respective pockets, each pad having a surface tangential to the transverse core circumference.

7. In an apparatus for making tire casings, a rigid core formed with lateral annular pockets at the junction of the transverse core circumference with the core web, substantially as described, and relatively deformable pads conforming to respective pockets, each pad presenting an oblique face outwardly to engage the corresponding toe flange of a tire casing laid up upon said core.

In testimony whereof I have signed my name in the presence of two subscribing witnesses.

BURGESS DARROW.

Witnesses:
C. L. LANDON,
C. V. P. NEWBOLD.